United States Patent [19]

Jung et al.

[11] Patent Number: 4,862,290
[45] Date of Patent: Aug. 29, 1989

[54] POWER FEEDING AND INPUT SIGNAL SWITCHING CONTROL SYSTEM FOR VIDEO TAPE RECORDER COMBINED WITH TELEVISION RECEIVER AND CAMERA IN A BODY

[75] Inventors: Se-Young Jung; Tea-Weon Moon, both of Suweon, Rep. of Korea

[73] Assignee: SamSung Electronkcs Co., Ltd., Seoul, Rep. of Korea

[21] Appl. No.: 87,868

[22] Filed: Aug. 21, 1987

[30] Foreign Application Priority Data

Aug. 22, 1986 [KR] Rep. of Korea .................... 6936[U]

[51] Int. Cl.$^4$ ............................................. H04N 5/44
[52] U.S. Cl. .................................. 358/335; 358/188; 358/190
[58] Field of Search .................... 358/335, 190, 191.1, 358/181, 188, 906

[56] References Cited

U.S. PATENT DOCUMENTS 3,484,548 12/1969 Kowal et al. ...................... 358/188
4,740,828 4/1988 Kinoshita ............................ 358/906

Primary Examiner—L. T. Hix
Assistant Examiner—David M. Gray
Attorney, Agent, or Firm—Robert E. Bushnell

[57] ABSTRACT

A power feeding and input signal switching control system for use in conjunction with a video tape recording and reproducing apparatus which includes a video tape recorder, a television receiver and a camera combined together in a body. Each power source for operating each device in the apparatus is selectively fed to only devices to be operated in response to a switching action in a controller and simultaneously an input source of video and audio signals to the video tape recorder is selectively switched by the same switching action in the controller.

15 Claims, 2 Drawing Sheets

POWER FEEDING AND INPUT SIGNAL SWITCHING CONTROL SYSTEM FOR VIDEO TAPE RECORDER COMBINED WITH TELEVISION RECEIVER AND CAMERA IN A BODY

BACKGROUND OF THE INVENTION

1. Field of the Invention

This invention relates to power feeding and input signal switching controls for video tape recorders, and particularly to a control system which selectively controls power feeding and input signal switching according to each function to be selected in a video tape recording and reproducing system having a video tape recorder, a television receiver, and a camera in a single body.

2. General Description of the prior Art

A video tape recorder is an apparatus to record video and audio signals in a cassette tape and thereby reproduce the video and audio signals as required, and is certainly one of the most commonly used electronic audio/visual devices nowadays. In general, a camera may be used as one of the input devices for any video signals, while a monitor device or a television receiver have been widely used for playing original video and/or audio signals reproduced out of the video tape recorder. In such a conventional configuration as mentioned just above, it is inevitable to independently employ a monitor device or a television receiver, as well as a camera set, together with the video tape recorder in order to reproduce the original video and audio signals out of the video cassette tape, wherein each electric power source voltage to each device in the system is separately fed and its control to select an input signal of all the video and/or audio sources is not performed in one step of operation, which has been inconvenient for users. In consideration of such problems as stated above, the video tape recorder consequently has been developed, which is combined into a body with a television receiver and a camera. Nonetheless, controls for power source and input signal switching fundamentally do not operate in one step of manipulation. Moreover, a relatively large power consumption has resulted from the large size of the all-combined system. As a result, these almost have become a considerable obstacle in compacting the system into the smaller size, and furthermore have not given enough satisfaction to the users in the viewpoint of its functions.

3. OBJECT OF THE INVENTION

It is therefore the object of this invention to provide a control system which enables a user to simultaneously and effectively control both electric power feeding and input signal switching in response to the function to be selected in a video tape recording and reproducing apparatus equipped with a television receiver and a camera in one body.

It is another object of this invention to provide a power control system which effectively enables a decrease in dissipation of power by only feeding electric power to each device in connection with the function to be selected in the video tape recording and reproducing apparatus.

SUMMARY OF THE INVENTION

The objects of the present invention are achieved with a control system for power feeding and input signal switching.

The control system comprises: a control for selectively switching on/off each operation of said video tape recorder, said television receiver and said camera and providing a plurality of main power sources; power feeding means adapted to be coupled to the control for supplying each operating power source voltage to said video tape recorder, said television receiver and/or said camera from the main power sources selectively provided by said control; and signal selector responsive to the switching of said control for selecting the input source of video and audio signals to said video tape recorder.

BRIEF DESCRIPTION OF THE DRAWINGS

The novel features which are believed to be characteristic of the invention, together with further objectives and advantages thereof, will be better understood from the following description considered in conjunction with the accompanying drawings. The drawings illustrate a presently preferred embodiment of the invention by way of example. It is to be expressively understood, however, that the drawings are for the purposes of illustration and description only and are not intended as a definition of the limits of the invention.

Like numbers in both figures refer to like elements.

DETAILED DESCRIPTION OF THE PREFERRED EMBODIMENT

Figure 1:
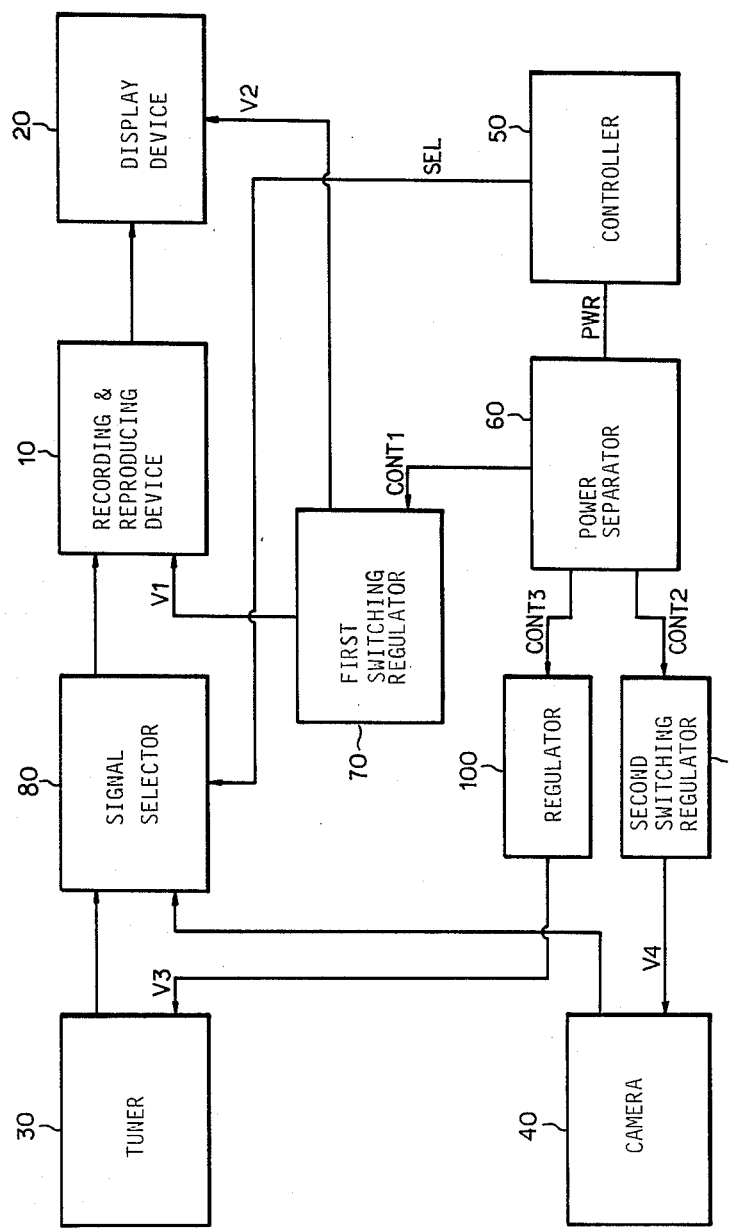
FIG. 1 is a block diagram of the preferred embodiment of the invention.

FIG. 1 is a block diagram of the preferred embodiment of the power feeding and input signal switching control system in accordance with the present invention, in which there are included a video tape recording and reproducing device 10 (conventionally referred to as "VTR") adapted to be fed by a power source voltage V1 for respectively recording and reproducing both audio and video signals, a display device 20 coupled to the recording and reproducing device 10 and adapted to be fed by a power source voltage V2 for displaying the video signals on a screen, a tuner 30 adapted to be fed by a power source voltage V3 for receiving television broadcasting signals in a selected channel, a camera 40 adapted to be fed by a power source voltage V4 for generating the video and audio signals out of the object selected and supplying the signals to the recording and reproducing device 10, a controller 50 for respectively providing a set of source voltages PWR and another set of selection control signals SEL in response to a selective switching for each function, a power separator 60 coupled to the controller 50 for selectively providing power control signals CONT1, CONT2 and/or CONT3 in response to the source voltage PWR selected, a first switching regulator 70 connected to the power separator 60 for feeding to both the recording and reproducing device 10 and the display device 20 each operating source voltage V1 and V2 by the power control signal CONT1, a second switching regulator 90 connected to the power separator 60 for feeding to the camera 40 an operating source voltage V4 by the power control signal CONT2, a regulator 100 connected to the power separator 60 for feeding to the tuner 30 an operating source voltage V3 by the power control signal CONT3, and a signal selector 80 coupled to the controller 50 to enable selection as a signal input source for the recording and reproducing device 10 either the tuner 30, the camera 40 or an exterior auxiliary input jack 33, 34 in response to the selection control signal SEL.

A switch 50 in the controller 50 makes up both the control signal SEL and the source voltage PWR at the same time, which are used to get each device to be selected as requested and its operating source voltage to be effectively fed in the combined video tape recording and reproducing apparatus. The source voltage PWR from the controller 50 contributes to produce the power control signals CONT1, CONT2 and/or CONT3, which respectively control the actual operations of the first switching regulator 70, the second switching regulator 90 and the regulator 100. By these controls, the regulators 70, 100 and 90 succeed to feed to the recording and reproducing device 10, the display device 20, the tuner 30 and the camera 40 each operating power source voltage V1, V2, V3 and VA. The selection control signal SEL is fed to the signal selector 80, by which the actual input signal to be applied to the recording and reproducing device 10 is selected out of a plurality of input sources such as a tuner, a camera, an exterior auxiliary input jack, etc. In the same time that one input signal source is selected to be operated, the recording and reproducing device 10 records and reproduces the input video and audio signals into/from the tape, so that the original signals may be played on the display device 20, or through any other means.

Figure 2:
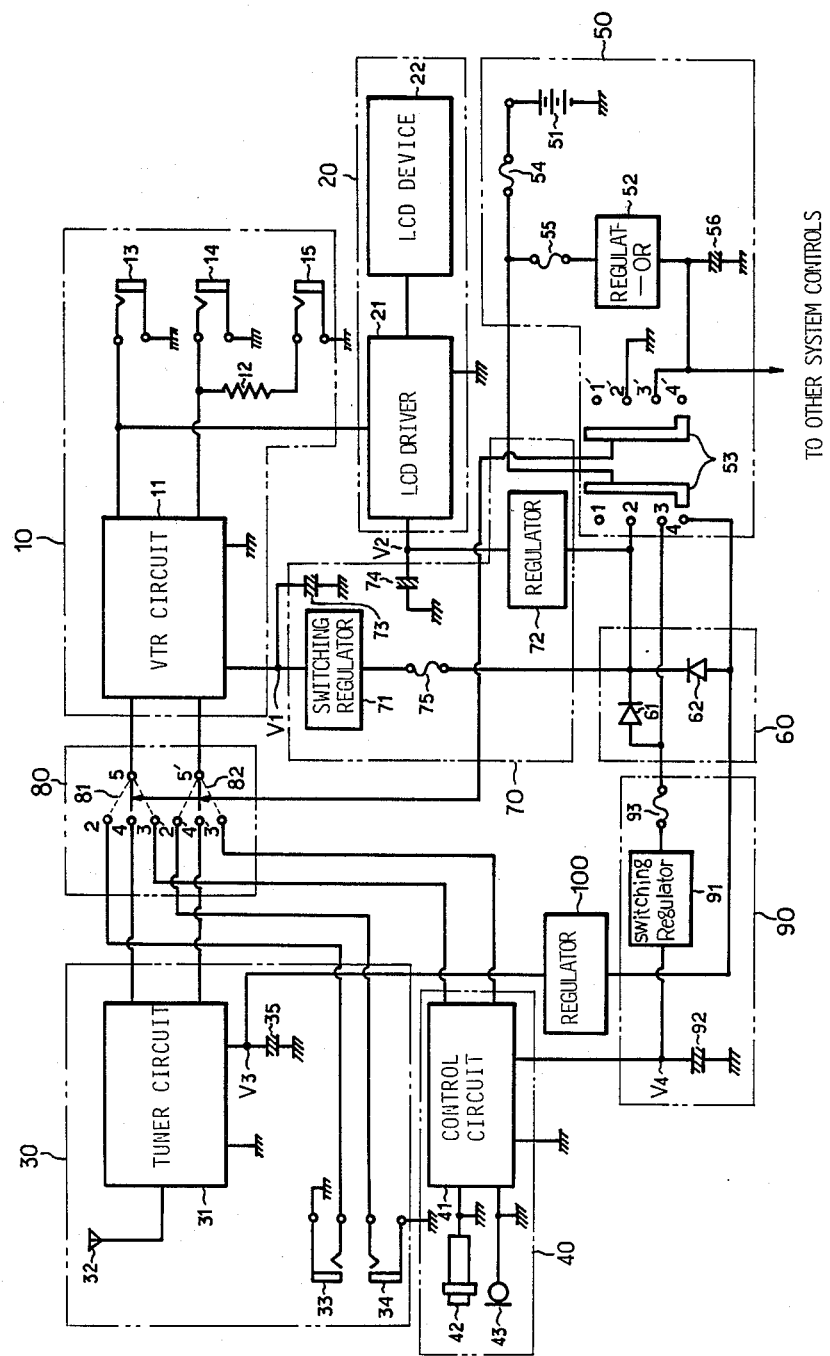
FIG. 2 is an electrical schematic diagram of the preferred embodiment of the invention.

FIG. 2 shows a electrical schematic diagram of the preferred embodiment of FIG. 1 in accordance with the present invention. In connection with FIG. 1, the recording and reproducing device 10 consists of a conventional VTR circuit 11, a resistor 12, a line video-out jack 13, a line audio-out jack 14 and an earphone jack 15. The display device 20 includes a liquid crystal display (LCD) device 22 and LCD driver 21 thereof which is connected to the VTR circuit 11. The tuner 30 includes a conventional tuner circuit 31 for receiving the television broadcasting signals, an antenna device 32, a line video-in jack 33, a line audio-in jack 34 and a capacitor 35. The camera 40 includes a microphone 43, a vidicon 42 and a control circuit 41 thereof. The controller 50 includes a battery 51, a regulator 52, a coupling switch 53, fuses 54 and 55, and a capacitor 56, the coupling switch 53 has four selective pairs of terminals 1—1', 2—2', 3—3' and 4—4' which are operated in each pair. The power separator has a diode 61 of which cathode is coupled to the terminal 2 of the switch 53 and anode is coupled to the terminal 3 of the switch 53, and another diode 62 of which cathode is coupled to the terminal 2 of the switch 53 and anode is coupled to the terminal 4 of the switch 53. The first switching regulator 70 includes a switching regulator 71, a regulator 72, capacitors 73, 74 and a fuse 75, the switching regulator 71 is coupled to the terminal 2 via the fuse 75 and the regulator 72 directly coupled to the same terminal 2. The signal selector 80 includes a video select switch 81 and an audio select switch 82, both of which are operated in connection with the coupling switch 53 in the controller 50. The terminals 2, 3 and 4 of the video select switch 81 are coupled to each video input or output port of the tuner circuit 31, the camera control circuit 41 or the line video-input jack 33, and in the same manner the terminals 2', 3' and 4' are coupled to each audio input or output port of the same. The terminals 5 and 5' are respectively coupled to the video and audio inputs of the VTR circuit 11. The second switching regulator 90 includes a switching regulator 91, a capacitor 92 and a fuse 93, the switching regulator 91 is connected via the fuse 93 to the terminal 3 of the switch 53. Here, all capacitors 35, 56, 73, 74 and 92 are used to clear the unnecessary surge voltages in the control system.

Now, the operation of the preferred embodiment of FIG. 2 will be described hereinafter in detail.

When the switch 53 is set into the terminal 1—1', all the power sources to the control system are turned off. But, once the switch 53 is set into the terminal 2—2', the source voltage from the battery 51 is fed to the terminal 2 and at the same time to the regulator 72 and, via the fuse 75, the switching regulator 71. Because the terminal 2' of the switch 53 is turned to the ground level, the switches 81 and 82 which are operated in connection with the operation of the switch 53 are both set into the terminals 2—2', and by these switch settings both the line video-in jack 33 and the line audio-in jack 34 are coupled to the VTR circuit 11 via the switches 81 and 82. The switching regulator 71 feeds a constant DC voltage V1 to the VTR circuit 11 and the regulator 72 feeds another constant DC voltage V2 to the LCD driver 21. Consequently, the VTR circuit 11 is operated to record the video and audio signals received via the video-in jack 33 and the audio-in jack 34 from the exterior system or reproduce any received video signals via the LCD driver 21 on the LCD device 22. Also, it enables transfer of the video and audio signals to any other exterior devices via the line video-out jack 13, the line audio-out jack 14 or the earphone jack 15.

In case that the switch 53 is set into terminals 3—3', the source voltage from the battery 51 is fed to its terminal 3, and at the same time, fed to the switching regulator 91 through the fuse 93 and to the switching regulator 71 and the regulator 72 through the forward-biased diode 61. To the terminal 3' of the switch 53 is fed a DC high voltage of a constant value from the regulator 52. This high voltage drives the select switches 81 and 82 to the terminals 3—3' which is respectively coupled to the video and audio output ports of the camera control circuit 41. Therefore, a constant DC voltage V4 is fed to the camera control circuit 41, and also the DC voltages V1 and V2 are simultaneously fed to the VTR circuit 11 and the LCD driver 21. Owing to these power connections, the video and audio signals generated in the vidicon 42 and the mike 43 are applied via the select switches 81 and 82 to the VTR circuit 11 to subsequently be recorded in the tape or reproduced on the LCD device 22.

In the meanwhile, when the switch 53 is set into terminals 4—4', the source voltage from the battery 51 is fed to its terminal 4, and simultaneously fed to the regulator 100 and both the switching regulator 71 and the regulator 72 via the forward-biased diode 62. At this time, the terminal 4' of the switch 53 is set to an open-circuited state, which drives the select switches 81 and 82 to the terminals 4—4' respectively coupled to the video and audio output ports of the tuner circuit 31. Therefore, another constant DC voltage V3 is fed to the tuner circuit 31, as well as the DC source voltages V1 and V2. By these power connections and input signal driving, the video and audio signals of the tuner circuit 31 generated from the television broadcasting signals received by the antenna 32 in a selected channel are respectively supplied to the VTR circuit 11 via the select switches 81 and 82 to subsequently be recorded in the tape or reproduced on the LCD device 22 and/or in any other output devices.

A described above, there will be achieved an efficient and easy control both in power feeding to each device and selecting of the signal input devices for the VTR system combined with the television receiver and the camera in a body because the manipulation of switching could be done in one stroke of operation. Furthermore, it will be possible to considerably reduce the useless power consumption in the VTR system because each power source voltage is fed to only the devices which are in operation.

What is claimed is:

1. A power feeding and input signal switching control system, comprising:

control means for selectively switching on/off each operation of a video tape recorder, a television receiver and a camera and providing a plurality of main power sources and selection control signals;

power feeding means adapted to be coupled to the control means for alternatively supplying each operating power source voltage exclusively to said video tape recorder, to said video tape recorder and said television receiver or to said video tape recorder and said camera in response to said main power sources selectively provided by said control means; and signal selecting means responsive to said selection controls signals supplied by said control means for selecting an input source of video and audio signals to said video tape recorder, said signal selecting means including a video select switch for selecting an input source of video signals to said video tape recorder and an audio select switch for selecting an input source of audio signals to said video tape recorder, said video select switch having a first input terminal coupled to a line video-in jack, a second input terminal coupled to a video output of said camera, a third input terminal coupled to a video output of a tuner of said television receiver and an output terminal coupled to a video input of said video tape recorder, said audio select switch having a first input terminal of said video tape recorder, said audio select switch having a first input terminal coupled to a line audio-in jack, a second input terminal coupled to an audio output of said camera, a third input terminal coupled to an audio output of a tuner of said television receiver and an output terminal coupled to an audio input of said video tape recorder, said input terminals of said select switches respectively being selected in a pair of video and audio signal inputs in response to said selection control signals;

whereby in accordance with the use of said video tape recorder, said television receiver and said camera, each of said main power sources selectively feed each said operating power source voltage exclusively to said video tape recorder to said video tape recorder and television receiver, or to said video tape recorder and camera and simultaneously the input source of the video and audio signals to said video tape recorder is selectively switched by said signal selecting means in response to said control means.

2. A power feeding and input signal switching control system, comprising:

control means including a switch having an array of terminals for power feeding and another array of terminals for input signal selecting with the arrays of terminals providing a plurality of pairs of terminals operated in pairs, a battery selectively coupled to each terminal of one array of terminals of said switch, a regulator connected between said battery and a terminal of said switch and a capacitor connected between said terminal a ground source, for selectively switching on/off each operation of a video tape recorder, a television receiver and a camera and providing a plurality of main power sources and selection control signals;

power feeding means adapted to be coupled to the control means for supplying each operating power source voltage to said video tape recorder, said television receiver and said camera in response to said main power sources selectively provided by said control means, said power feeding means including a plurality of leads coupled to said control means with a first one of said leads coupled to provide said power to the recorder exclusive of the receiver and camera, a second one of said leads coupled to provide said power to the recorder and to the receiver exclusive of the camera, and a third one of said leads coupled to provide said power to the recorder and to the camera exclusive of the receiver; and signal selecting means responsive to said selection control signals supplied by said control means for selecting an input source of video and audio signals to said video tape recorder;

whereby in accordance with the use of said video tape recorder, said television receiver and said camera, each of said main power sources selectively feed each said operating power source voltage to each of said recorder, receiver and camera and simultaneously the input source of the video and audio signals to said video tape recorder is selectively switched by said signal selecting means in response to said control means.

3. A power feeding and input signal switching control system, comprising:

control means for selectively switching on/off each operation of a video tape recorder, a television receiver and a camera and providing a plurality of main power sources and selection control signals;

power feeding means adapted to be coupled to the control means for alternatively supplying each operating power source voltage exclusively to said video tape recorder, to said video tape recorder and said television receiver or to said video tape recorder and said camera in response to said main power sources selectively provided by said control means, said power feeding means including a plurality of leads coupled to said control means with a first one of said leads coupled to provide said power to the recorder, a second one of said leads coupled to provide said power to the recorder and to the receiver, and a third one of said leads coupled to provide said power to the recorder and to the camera; and signal selecting means responsive to said selection control signals supplied by said control means for selecting an input source of video and audio signals to said video tape recorder;

whereby in accordance with the use of said video tape recorder, said television receiver and said camera, each of said main power sources selectively feed each said operating power source voltage exclusively to said video tape recorder, to said video tape recorder and television receiver, or to said video tape recorder and camera and simultaneously the input source of the video and audio signals to said video tape recorder is selectively switched by said signal selecting means in response to said control means.

4. The power feeding and input switching control system of claim 1, wherein said control means comprises:

a first array of terminals dedicated to distribution of power from said main power source to said power feeding means;

a second array of terminals dedicated to applying said selection control signals to said signal selecting means;

with terminals of said first and second arrays operable in conjugate pairs for simultaneously controlling distribution of power to the recorder and to a selected one of the receiver and camera providing video and audio signals to the recorder.

5. A power feeding and input signal switching control system, comprising:

control means for selectively switching on/off each operation of a video tape recorder, a television receiver and a camera and providing a plurality of main power sources and selection control signals, said control means including:

a first array of terminals dedicated to distribution of power from said main power source to said power feeding means;

a second array of terminals dedicated to applying said selection control signals to said signal selecting means; and with terminals of said first and second arrays operable in conjugate pairs for simultaneously controlling distribution of power to the recorder and to a selected one of the receiver and camera providing video and audio signals to the recorder;

power feeding means adapted to be coupled to the control means for alternatively supplying each operating power source voltage exclusively to said video tape recorder, to said video tape recorder and said television receiver or to said video tape recorder and said camera in response to said main power sources selectively provided by said control means, said power feeding means including a plurality of leads coupled to different terminals of said first array, with a first one of said leads coupled to provide said power to the recorder, a second one of said leads coupled to provide said power to the recorder and to the receiver, and a third one of said leads coupled to provide said power to the recorder and to the camera; and signal selecting means responsive to said selection control signals supplied by said control means for selecting an input source of video and audio signals to said video tape recorder;

whereby in accordance with the use of said video tape recorder, said television receiver and said camera, each of said main power sources selectively feed each said operating power source voltage exclusively to said video tape recorder, to said video tape recorder and television receiver, or to said video tape recorder and camera and simultaneously the input source of the video and audio signals to said video tape recorder is selectively switched by said signal selecting means in response to said control means.

6. The power feeding and input switching control system of claim 4, wherein said power feeding means comprises:

a plurality of leads coupled to nodes of said first array, with a first one of said leads coupled to provide said power to the camera, a second one of said leads coupled to provide said power to the receiver, and third one of said leads coupled to provide said power to the recorder;

first means coupled between said second and third leads, for rectifying current flow between said second and third leads; and second means coupled between said first and third leads, for rectifying current flow between said first and third leads.

7. A power feeding and input signal switching control system, comprising:

control means including a switch having an array of terminals for power feeding another array of terminals for input signal selecting with the arrays of terminals providing a plurality of pairs of terminals operated in pairs, a battery selectively coupled to each terminal of one array of terminals of said switch, a regulator connected between said battery and a terminal of said switch and a capacitor connected between said terminal and a ground source, for selectively switching on/off each operation of a video tape recorder, a television receiver and a camera and providing a plurality of main power sources and selection control signals;

power feeding means having a plurality of leads coupled to different terminals of said array of terminals for power feeding, with a first one of said leads coupled to provide said power to the recorder exclusive of the receiver and camera, a second one of said leads coupled to provide said power to the recorder and to the receiver exclusive of the camera, and a third one of said leads coupled to provide said power to the recorder and to the camera exclusive of the receiver; and signal selecting means responsive to said selection control signals supplied by said control means for selecting an input source of video and audio signals to said video tape recorder;

whereby in accordance with the use of said video tape recorder, said television receiver and said camera, each of said main power sources selectively feed each said operating power source voltage to said recorder, receiver and camera and simultaneously the input source of the video and audio signals to said video tape recorder is selectively switched by said signal selecting means in response to said control means.

8. The power feeding and input switching control system of claim 2, wherein said power feeding means comprises:

a plurality of leads coupled to nodes of said array of terminals for power feeding, with a first one of said leads coupled to provide said power to the camera exclusive of the receiver, a second one of said leads coupled to provide said power to the receiver exclusive of the camera, and a third one of said leads coupled to provide said power to the recorder;

first means coupled between said second and third leads, for regulating current flow between said second and third leads; and second means coupled between said first and third leads, for regulating current flow between said first and second leads.

9. The power feeding and input switching control system of claim 2, wherein:
said control means enables a plurality of modes of operation of the video tape recorder, the television receiver and the camera with both said operating power source voltage and selection control signals being simultaneously provided during a plurality of said modes; and
said signal selecting means comprises a first set of video and audio terminals coupling the recorder to receive external sources of video and audio signals in response to a selection control signal during a first of said modes, a second set of video and audio terminals coupling the recorder to receive video and audio signals from the receiver during a second of said modes, and third set of video and audio terminals coupling the recorder to receive video and audio signals from the camera in response to a selection control signal during a third of said modes.

10. The power feeding and inputting switching control system of claim 9, wherein said power feeding means comprises:
a plurality of leads coupled to nodes of the array of terminals for power feeding, with a first one of said leads coupled to provide said power to the camera, a second one of said leads coupled to provide said power to the receiver, and a third one of said leads coupled to provide said power to the recorder;
first means coupled between said second and third leads, for regulating current flow between said second and third leads during second mode; and
second means coupled between said first and third leads, for rectifying current flow between said first and third leads during said third mode.

11. A power feeding and input switching control system, comprising:
control means enabling a plurality of selectable alternative modes of operation of a recorder, a receiver and a camera, for providing a main power source and selection control signals for said modes, with both said main power source and selection control signals being simultaneously provided during a plurality of said modes;
power feeding means controlled by said control means, for supplying power from said main power source to the recorder exclusive of the receiver and the camera during a first of said modes, to the recorder and receiver exclusive of the camera during a second of said modes, and to the recorder and camera exclusive of the receiver during a third of said modes; and
signal selecting means for responding to said selection control signals by connecting the recorder to receive external sources of video and audio signals during said first mode, connecting the recorder to receive video and audio signals from the receiver during said second mode, and connecting the recorder to receive video and audio signals from the camera during said third mode, said signal selecting means including:
a first set of video and audio terminals coupling the recorder to receive external sources of video and audio signals in response to a selection control signal during said first mode;
a second set of video and audio terminals coupling the recorder to receive video and audio signals from the receiver during said second mode; and
a third set of video and audio terminals coupling the recorder to receive video and audio signals from the camera in response to a selection control signal during said third mode.

12. The power feeding and input switching control system of claim 11, wherein said power feeding means comprises a plurality of leads coupled to said control means with a first one of said leads coupled to provide said power to the recorder during said first mode, a second one of said leads coupled to provide said power to the recorder and to the receiver during said second mode, and a third one of said leads coupled to provide said power to the recorder and to the camera during said third mode.

13. A power feeding and input switching control system of claim 11, wherein said control means comprises:
a first array of terminals dedicated to distribution of power from said main power source to said power feeding means;
a second array of terminals dedicated to applying said selection control signals to said signal selecting means; and
with terminals of said first and second arrays operable in conjugate pairs for simultaneously controlling distribution of power to the recorder and to a selected one of the receiver and camera providing video signals to the recorder.

14. The power feeding and input switching control system of claim 13, wherein said power feeding means comprises a plurality of leads coupled to different terminals of said first array, with a first one of said leads coupled to provide said power to the recorder during said first mode, a second one of said leads coupled to provide said power to the recorder and to the receiver during said second mode, and a third one of said leads coupled to provide said power to the recorder and to the camera during said third mode.

15. The power feeding and input switching control system of claim 13, wherein said power feeding means comprises:
a plurality of leads coupled to nodes of said first array, with a first one of said leads coupled to provide said power to the camera, a second one of said leads coupled to provide said power to the receiver, and a third one of said leads coupled to provide said power to the recorder;
first means coupled between said second and third leads, for regulating current flow between said second and third leads during said second mode; and
second means coupled between said first and third leads, for regulating current flow between said first and third leads during said third mode.

* * * * *

UNITED STATES PATENT AND TRADEMARK OFFICE
CERTIFICATE OF CORRECTION

PATENT NO.   : 4,862,290
DATED        : August 29, 1989
INVENTOR(S)  : Se-Young Jung, et al It is certified that error appears in the above-identified patent and that said Letters Patent is hereby corrected as shown below:

On the title page assignee should read

--(73) Assignee: SamSung Electronics Co., Ltd. --.

Signed and Sealed this

Eleventh Day of September, 1990

*Attest:*

HARRY F. MANBECK, JR.

*Attesting Officer*     *Commissioner of Patents and Trademarks*